J. A. BERCHTOLD.
YARDSTICK SUPPORT.
APPLICATION FILED APR. 1, 1914.
1,143,489.
Patented June 15, 1915.
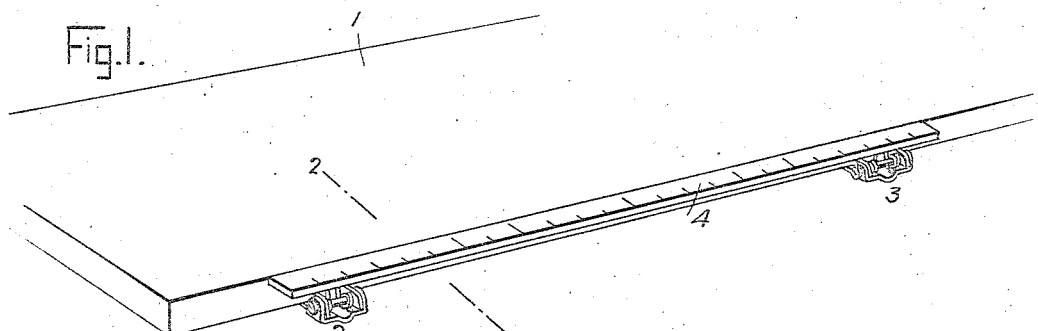
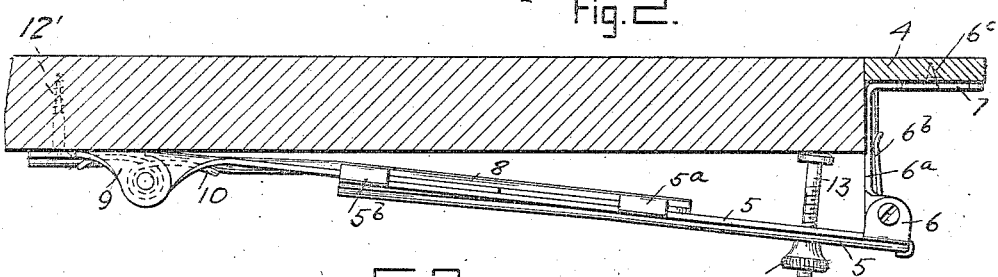
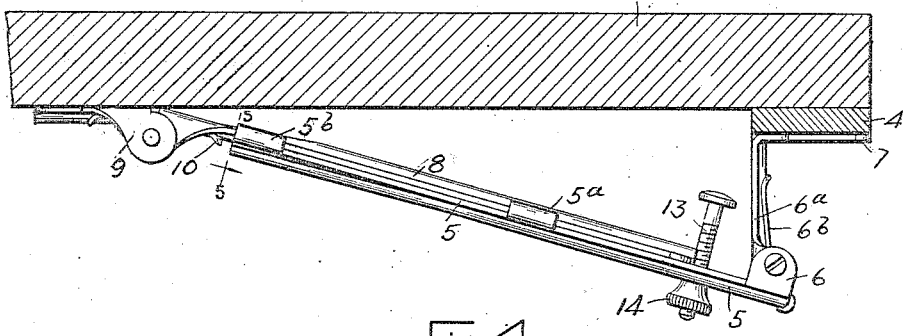
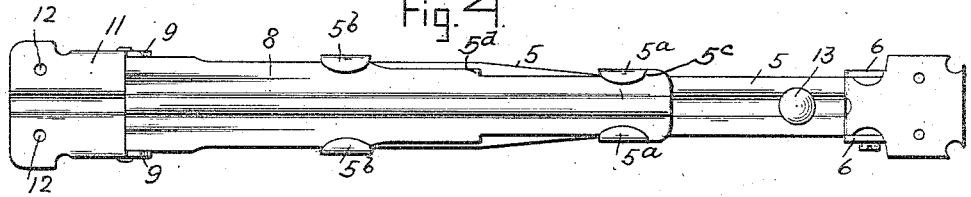
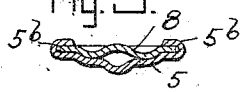
WITNESSES
E. H. Reichenbach.
Walton Harrison
INVENTOR
JOHN A. BERCHTOLD
BY
ATTORNEYS

UNITED STATES PATENT OFFICE.

JOHN ALBERT BERCHTOLD, OF SIGEL, ILLINOIS.

YARDSTICK-SUPPORT.

1,143,489.     Specification of Letters Patent.    Patented June 15, 1915.

Application filed April 1, 1914. Serial No. 828,715.

*To all whom it may concern:*

Be it known that I, JOHN A. BERCHTOLD, a citizen of the United States, and a resident of Sigel, in the county of Shelby and State of Illinois, have invented a new and Improved Yardstick-Support, of which the following is a full, clear, and exact description.

This invention relates to supports for measuring devices, and particularly to yard stick supports, and has for an object to provide an improved structure whereby a yard stick may be connected with a counter or other similar structure in such a manner as to have the yard stick continually in place for use and out of the way when not actually being used.

Another object of the invention is to produce a yard stick support provided with supporting members, each having a substantially pivotally mounted member telescoping over a swinging member whereby the yard stick may be raised and lowered, and moved back and forth for adjusting the same to an operative and inoperative position.

In carrying out the object of the invention a yard stick is provided formed with the usual graduations. This yard stick is connected with a sliding member which in turn is slidingly supported by a pivotally mounted or spring member arranged beneath the counter or other support whereby the yard stick member may be placed beneath the counter or moved to a position flush with the top of the counter.

In the accompanying drawings—Figure 1 is a perspective view of part of the counter and a yard stick support embodying the invention applied thereto; Fig. 2 is a sectional view through Fig. 1, approximately on line 2—2; Fig. 3 is a sectional view similar to Fig. 2, except that the yard stick is shown beneath the counter; Fig. 4 is an enlarged detail plan view of the support for the yard stick; and Fig. 5 is a detailed fragmentary sectional view of a structure forming part of the support shown in Fig. 4.

A counter is shown at 1, and connected with it are two telescopic brackets designated as 2 and 3. These brackets carry a yard stick 4, which may be of the usual or any desired structure. Each bracket comprises a slide 5 provided with ears 5ª, 5ᵇ, and also with a bearing 6. A supporting strip 6ª, is journaled to the bearing 6, and is engaged by a leaf spring 6ᵇ which normally tends to force it gently to the left according to Fig. 2. The strip 6ª is provided with an upwardly extending portion 7, to which the yard stick is secured by fastenings 6ᶜ, which in this instance are screws.

An arm 8 is mounted upon a bearing 9, and is adapted to swing relatively to the latter. A leaf spring 10, carried by the bearing 9, engages the slide 5 and tends to maintain the latter in horizontal position. The bearing 9 is integral with a plate 11, the latter being provided with holes 12. By aid of these holes, fastenings 12' secure the plate 11 upon the underside of the counter 1, and thus hold the bearing 9 in position.

A threaded bolt 13 extends through the slide 5, and is adjustable relatively to the same by rotation of the bolt. A nut 14 is fitted upon the bolt and may be jammed against the slide 5, so as to lock the bolt in any position into which the latter may be adjusted.

By adjusting the threaded bolt 13, as just described, the slide 5 and swinging arm 8, together constituting a longitudinal supporting member for the yard stick 4, may be brought into such angular position relatively to the counter 1 as to support the yard stick 4 with its upper surface exactly flush with the upper surface of the counter, as indicated in Figs. 1 and 2.

In some instances, it may be desirable to normally keep the yard stick 4 below the counter 1. This is done as indicated in Fig. 3. The adjusting bolt 13 serves the purpose of a limiting stop for preventing excessive upward travel of the yard stick.

The tension of the springs 10 and 6ᵇ is so adjusted that, when the parts occupy the positions indicated in Fig. 3, the upper surface of the yard stick 4 rests flush against the adjacent lower surface of the counter.

In applying my device to counters of different thickness, the bolt 13 is adjusted as described.

The operation of my device is as follows: The parts being assembled and arranged as described, the yard stick is used by either stretching the goods alongside of it as the goods rest upon the counter, or by shifting the yard stick laterally outwardly from the counter, the slides 5 moving bodily outwardly and thus facilitating this purpose.

It will be seen from Fig. 4 that the slide 5 is guided by the ears 5ª and 5ᵇ, and is limited in its sliding or reciprocatory movement by the ears 5ª engaging the respective shoulders 5ᶜ and 5ᵈ, said shoulders limiting the extreme outward movement and the extreme inward movement.

With the parts properly adjusted, as soon as the yard stick after being used is released, it tends to return to its normal position.

I do not limit myself to the precise mechanism shown, as variations may be made therein without departing from the spirit of my invention.

Having thus described my invention, what I claim as new and desire to secure by Letters Patent is as follows:—

1. In a support of the class described, the combination with a table and a yard stick support designed to be arranged along one edge thereof and flush with the top, and also arranged beneath the counter, of a spring pressed support, a sliding member connected with said spring pressed support, an upstanding member arranged on said sliding member for spacing said yard stick above said support, and a stop for limiting the upward swinging movement of said swinging member so as to stop the upward movement of said yard stick when moved to a position flush with the top of the counter.

2. In a yard stick support, the combination with a counter or other supporting member, of a spring pressed swinging arm, a sliding arm arranged on said swinging arm and adapted to move longitudinally thereof so that the end of the sliding arm may be arranged beneath said counter or project therebeyond, a stop for limiting the swinging movement of said swinging arm and sliding member toward the counter, and a hinged spring pressed stick support arranged adjacent the end of said sliding member so as to press said yard stick against the edge of said counter when the end of said sliding member has been moved to a position beyond said counter.

3. In a supporting device for yard sticks, the combination with a counter of a spring pressed swinging arm connected at one end with said counter on the lower side, and designed to have the free end yield in a direction substantially at right angles to the counter, a sliding member arranged on said arm and designed to move transversely of the counter so that the outer end thereof will move toward and from the edge of the counter, and means for connecting a yard stick with the outer end of said sliding support, said means being spring pressed so as to hold said stick against said counter when moved flush therewith by said swinging arm.

4. In a support for yard sticks, the combination with a counter, of a plurality of supports, each of said supports comprising a swinging arm connected to one side of the counter and free to swing at the outer end, a sliding member arranged on each arm and formed with means for guiding the same in a back and forth movement on said swinging arm, and a yard stick connected with the outer ends of said sliding members.

5. In a yard stick support of the class described, a spring pressed swinging arm formed with shoulders intermediate its length, a sliding strip arranged on said arm and formed with substantially encircling ears designed to engage said shoulders for limiting the sliding movement of said sliding member in one direction, means for limiting the swinging movement of said resilient member in one direction, and means for pivotally connecting the yard stick with said swinging arm.

6. In a yard stick support, the combination of a counter, a sliding support for a yard stick, a swinging support for said sliding support and an adjustable stop connected with said swinging support, and adapted to engage said counter for limiting the movement of said sliding support and the action of said swinging support in a direction toward the upper face of the counter whereby said sliding support may be moved transversely of the counter and then at right angles to the plane of the counter so as to position a yard stick connected with the sliding support flush with the counter and beneath the counter, at will.

In testimony whereof I have signed my name to this specification in the presence of two subscribing witnesses.

JOHN ALBERT BERCHTOLD.

Witnesses:
  Jos. B. GIER,
  BERTHA M. BERCHTOLD.